US007539007B2

(12) United States Patent
Zhao et al.

(10) Patent No.: US 7,539,007 B2
(45) Date of Patent: May 26, 2009

(54) METHODS AND STRUCTURES FOR ELECTRICALLY COUPLING A CONDUCTOR AND A CONDUCTIVE ELEMENT COMPRISING A DISSIMILAR MATERIAL

(75) Inventors: Hailiang Zhao, Maple Grove, MN (US); Steven J. May, Minnetonka, MN (US); Jeffrey S. Lund, Forest Lake, MN (US); Kurt J. Casby, Grant, MN (US)

(73) Assignee: Medtronic, Inc., Minneapolis, MN (US)

( * ) Notice: Subject to any disclaimer, the term of this patent is extended or adjusted under 35 U.S.C. 154(b) by 540 days.

(21) Appl. No.: 11/321,358

(22) Filed: Dec. 29, 2005

(65) Prior Publication Data

US 2007/0155149 A1 Jul. 5, 2007

(51) Int. Cl.
*H01G 9/04* (2006.01)

(52) U.S. Cl. ....................... 361/508; 361/509; 361/504; 361/512; 361/523; 361/528

(58) Field of Classification Search ................ 361/508, 361/509–512, 516–519, 523–525, 528–530, 361/503–504
See application file for complete search history.

(56) References Cited

U.S. PATENT DOCUMENTS 3,443,306 A 5/1969 Meyer
3,733,686 A 5/1973 Maucher
4,353,951 A 10/1982 Yukitoshi et al.
4,594,293 A 6/1986 Kawauchi
5,983,472 A * 11/1999 Fayram et al. ............ 29/25.42
6,118,651 A * 9/2000 Mehrotra et al. ............ 361/509
6,149,049 A 11/2000 Loftfield et al.
6,687,116 B2 * 2/2004 Hudis ........................ 361/502
6,709,946 B2 * 3/2004 O'Phelan et al. ............ 438/396
6,716,554 B2 4/2004 Tsukamoto et al.

OTHER PUBLICATIONS

A.G. Mamalis et al., "Macroscopic and Microscopic Phenomena of Nickel/Titanium "Shape Memory" Bimetallic Strips Fabricated by Explosive Cladding and Rolling", Materials Science and Engineering, A188 (1994) 267-275.

* cited by examiner

*Primary Examiner*—Nguyen T Ha
(74) *Attorney, Agent, or Firm*—Stephen W. Bauer; Scott A. Bardell

(57) ABSTRACT

Methods and structures are provided for electrically coupling a conductor and a conductive element containing a dissimilar material. A method for electrically coupling a first element containing a first conductive material to a conductor formed of a dissimilar second material includes cladding a second conductive element with the conductor. The second element contains a facilitator material that facilitates the melting of the dissimilar material. A third element containing a third conductive material that is metallurgically compatible with the facilitator material is cladded with a fourth element containing a fourth conductive material that is metallurgically compatible with the first conductive material to form a connector. The fourth element is welded to the first element and the second element is welded to the third element.

16 Claims, 7 Drawing Sheets

METHODS AND STRUCTURES FOR ELECTRICALLY COUPLING A CONDUCTOR AND A CONDUCTIVE ELEMENT COMPRISING A DISSIMILAR MATERIAL

FIELD OF THE INVENTION

The present invention generally relates to dissimilar electrically conductive materials, and more particularly relates to methods and structures for electrically coupling a conductor to a conductive element formed of a dissimilar material.

BACKGROUND OF THE INVENTION

A variety of electrical devices use electrochemical cells, such as batteries, capacitors, and the like, for or during operation. The electrochemical cells are electrically coupled to other electrical circuits in the device using conductors that are laser welded or otherwise bonded to the terminals of the electrochemical cell at one end and to other electrical circuits at another end. However, connecting the conductors to the electrochemical cells can pose significant challenges. Typically, the conductors are formed of copper or copper alloys, although other conductive materials such as aluminum, silver, and gold also have been used. While copper is a preferred material for connective conductors because of its high conductivity, it is difficult to weld due to its high reflectivity and high thermal conductivity.

In addition, the conductors and the terminals of the electrochemical cell often are formed of dissimilar materials, that is, materials that do not readily intermix and form ductile and reliable welds. In the case of batteries, for example, a first terminal of the electrochemical cell typically includes an element or component of the housing of the electrochemical cell. The housing component may be formed of a material such as titanium, which does not readily form a ductile and reliable weld with copper. A second terminal includes a feedthrough pin that extends from internally within the electrochemical cell through the housing to the exterior of the cell. The feedthrough pin may be formed of a material such as niobium, which also is dissimilar from copper. If a copper-comprising conductor is welded to a terminal of the electrochemical cell at too high of a temperature, the conductor may be burned or otherwise damaged, leading to lower device yield. On the other hand, if attempts are made to weld the copper-comprising conductor to a terminal at too low of a temperature, the weld may not be reliable.

Accordingly, it is desirable to provide a method for electrically coupling a conductor to a dissimilar conductive element. In addition, it is desirable to provide a connector for electrically coupling an electrochemical cell and an electrically conductive component that is formed of a dissimilar material. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In accordance with an exemplary embodiment of the invention, a method is provided for electrically coupling a first element comprising a first conductive material to a conductor formed of a dissimilar second material. The method comprises cladding a second conductive element with the conductor. The second element comprises a facilitator material that facilitates the melting of the dissimilar material. A third element comprising a third conductive material that is metallurgically compatible with the facilitator material is cladded with a fourth element comprising a fourth conductive material that is metallurgically compatible with the first conductive material to form a connector. The fourth element is welded to the first element and the second element is welded to the third element.

In accordance with another exemplary embodiment of the invention, a method is provided for electrically coupling a housing component of an electrochemical cell to a conductor, wherein the housing component comprises a first conductive material and the conductor comprises a dissimilar conductive material. The method comprises bonding a first conductive element comprising a second conductive material to the conductor. The second conductive material is metallurgically compatible or bondable with the dissimilar conductive material of the conductor. A second conductive element comprising the second conductive material is cladded to a third conductive element comprising the first conductive material to form a connector. The first conductive element and the second conductive element being welded together and the third conductive element and the housing component are welded together.

In accordance with a further exemplary embodiment of the invention, a connector for electrically coupling an electrochemical cell to an electrical assembly by electrical conductors is provided. The electrochemical cell includes a housing component comprising a first conductive material and a feedthrough pin that extends through the housing component and that comprises a second conductive material. The electrical conductors comprise a third conductive material that is dissimilar from the first conductive material. The connector comprises a first conductive component formed of a cladded combination of the first conductive material configured for welding to the housing component and a fourth conductive material configured for welding to one of the electrical conductors. A first exposed surface of the first conductive component that comprises the fourth conductive material lies in a first plane. The connector further comprises a second conductive component comprising the fourth conductive material configured for welding to another of the electrical conductors and having a first conduit configured to receive the feedthrough pin. An exposed surface of the second conductive component comprising the fourth conductive material lies in the first plane. The connector also comprises an insulating element physically connecting the first conductive component and the second conductive component and electrically insulating the first conductive component and the second conductive component.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
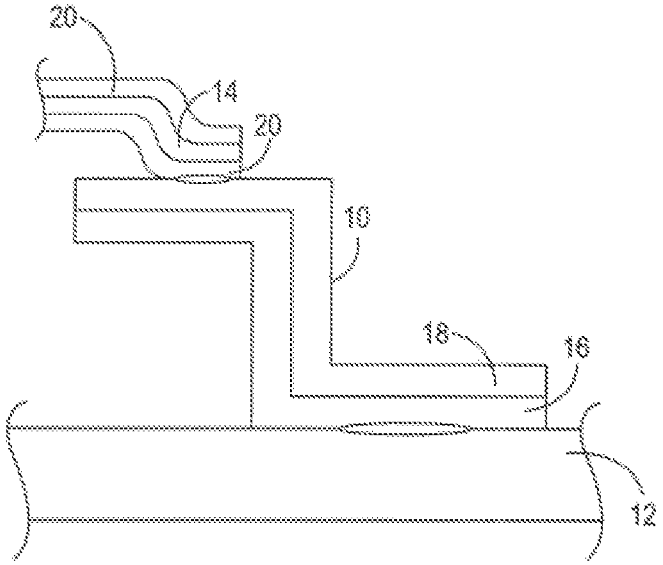
FIG. 1 is a cross-sectional view of a connector electrically coupling a copper-comprising conductor and a dissimilar conductive material, in accordance with an exemplary embodiment of the present invention.

Referring to FIG. 1, in accordance with an exemplary embodiment of the present invention, a conductor 14 is electrically coupled to a first conductive element 12 by a connector 10 and a cladded second conductive element 20. The conductor 14 comprises any suitable conductive material, such as copper, gold, silver, aluminum, an alloy thereof, or the like. The first conductive element 12 may comprise a housing component, such as a casing or a casing cover, of the housing of an electrochemical cell, such as a battery, a capacitor, or the like. Alternatively, first conductive element 12 may comprise any other component of an electronic assembly. The first conductive element 12 comprises a first conductive material that is dissimilar from the conductive material of the conductor. As used herein, the term "dissimilar" as it applies to two conductive materials means that the two materials do not readily intermix upon melting to form a ductile and reliable weld. For example, if the conductor is formed of copper, the first conductive material may be titanium, stainless steel, or the like, which do not readily intermix with copper upon melting to form a ductile and reliable weld.

Second conductive element 20 is cladded with conductor 14 and comprises a facilitator material, that is, a material that facilitates the melting of conductor 14. For example, if the conductor comprises copper, second conductive element 20 may comprise nickel. Nickel is less reflective to laser radiation than copper. Accordingly, during laser welding, nickel absorbs more energy than the copper. The energy is converted to heat causing melting of the nickel, which in turn causes the copper to melt. Nickel also dissipates less heat than copper, further facilitating the melting of copper. In addition, nickel is "metallurgically compatible" with copper, that is, copper and nickel intermix to form a ductile and reliable weld upon melting. The second conductive element may be cladded with the conductor 14 using any suitable cladding method, such as hot roll cladding, hot press cladding, explosive cladding, fusion cladding, chemical vapor deposition (CVD), sputtering, physical vapor deposition (PVD), or the like. Preferably, the second conductive element 20 is cladded with conductor 14 so that the second conductive element 20 wraps around or envelopes the conductor to further enhance welding of the conductor.

Connector 10 comprises a third conductive element 16 and a fourth conductive element 18 that also have been cladded together. Third conductive element 16 comprises the first conductive material or a material that is metallurgically compatible with the first conductive material. Preferably, third conductive element 16 comprises the first conductive material. Fourth conductive element 18 comprises the facilitator material or a material that is metallurgically compatible with the facilitator material. Preferably, fourth conductive element 18 comprises the facilitator material. The third conductive element 16 may be cladded with the fourth conductive element 18 using any suitable cladding method, such as any of the cladding methods set forth above.

Fourth conductive element 18 is welded to second conductive element 20 and third conductive element 16 is welded to first conductive element 12, thus electrically coupling conductor 14 and first conductive element 12. In this manner, conductor 14 is electrically coupled to first conductive element 12, which is formed of a material that is dissimilar from the conductor material, without burning or otherwise damaging conductor 14 and/or first conductive element 12. In addition, the conductor 14 and the first conductive element 12 are reliably coupled together.

Figure 2:
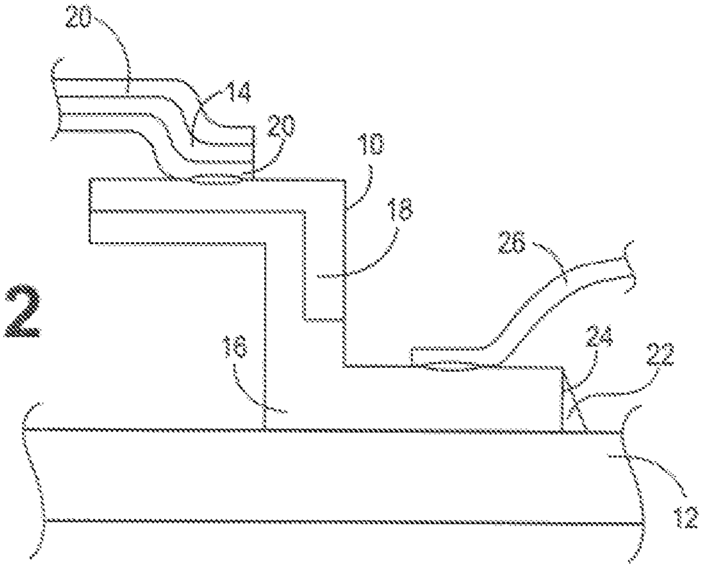
FIG. 2 is a cross-sectional view of a connector electrically coupling a copper-comprising conductor and a dissimilar conductive material, in accordance with another exemplary embodiment of the present invention.
Figure 3:
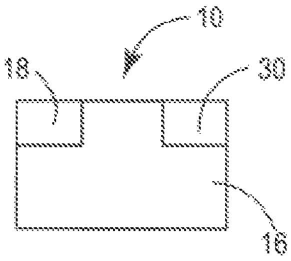
FIG. 3 is a cross-sectional view of a connector, in accordance with a further exemplary embodiment of the present invention.
Figure 4:
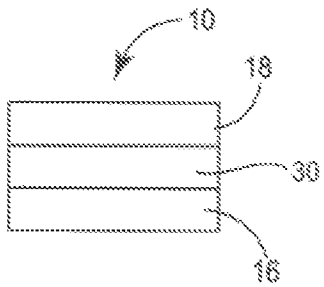
FIG. 4 is a cross-sectional view of a connector, in accordance with another exemplary embodiment of the present invention.

It will be appreciated that third and fourth conductive elements 16, 18 of connector 10 may be cladded together in any suitable orientation that facilitates the electrical coupling of conductor 14 and first conductive element 12. For example, referring to FIG. 2, in one exemplary embodiment of the invention, third conductive element 16 may be laser welded to first conductive element 12 using a laser weld 22 along a side 24 of third conductive element 16 that is not parallel to first conductive element 12. In this regard, fourth conductive element 18 may be cladded to third conductive element 16 as an inlay, thus providing a large surface area of side 24 for laser welding. Using this orientation, a fifth conductive element 26 also may be welded to third conductive element 16 at a surface other than a surface 28 that lies adjacent to first conductive element 12. In another exemplary embodiment of the invention, it may be desirable to clad third conductive element 16, fourth conductive element 18 and another conductive element 30 together. Thus, connector 10 may have a cross-section as illustrated in FIG. 3. Alternatively, conductive element 30 may be configured as an interlayer disposed between third and fourth conductive elements 16, 18, as illustrated in FIG. 4. Of course, it will be understood that connector 10 may comprise any suitable number of conductive elements oriented in any suitable orientation, including inlays, overlays, and interlayers, to meet accessibility and geometry requirements.

Figure 5:
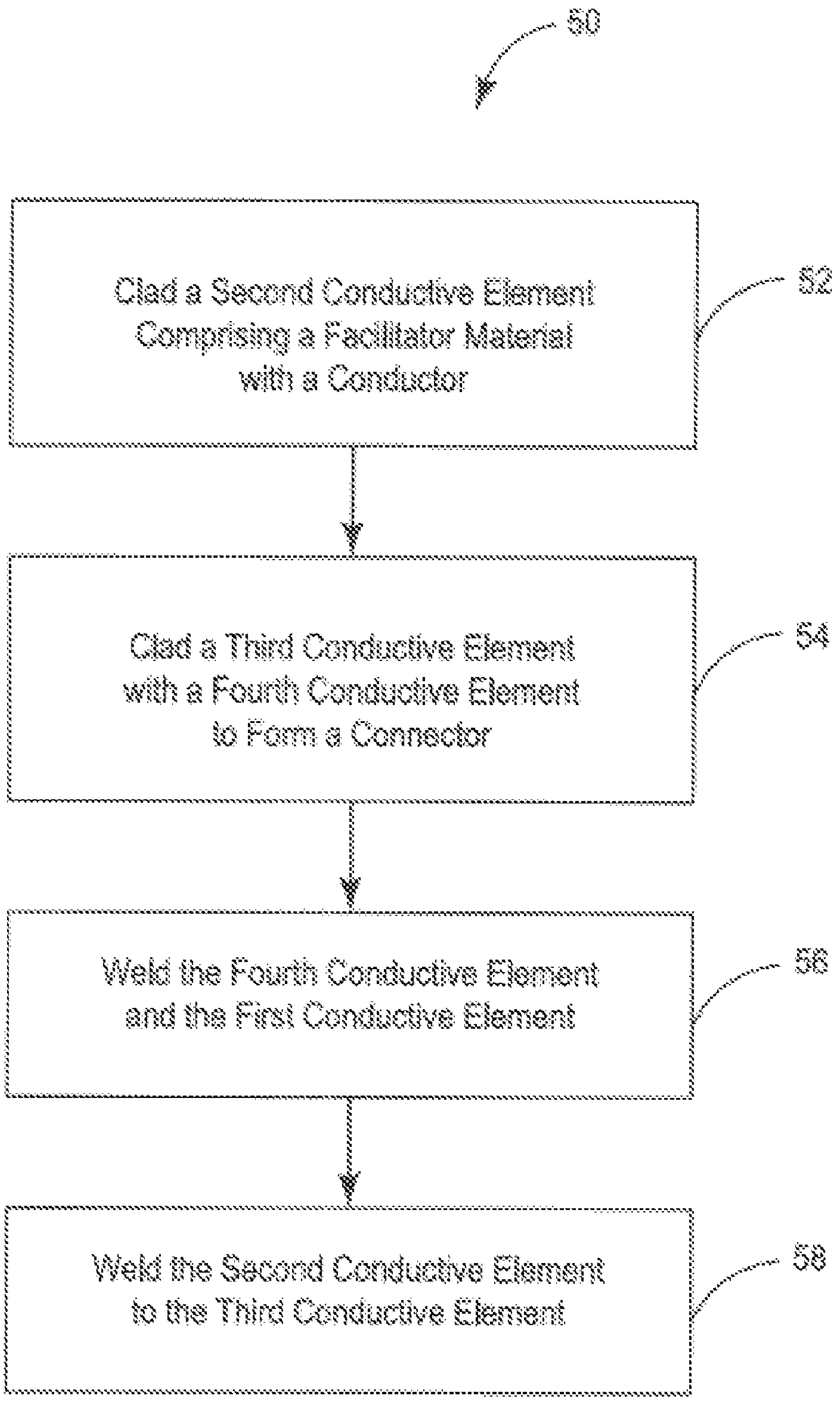
FIG. 5 is a flow chart illustrating a method for electrically coupling a copper-comprising conductor and a dissimilar conductive element, in accordance with an exemplary embodiment of the present invention.

A method 50 for electrically coupling a first conductive element, such as first conductive element 12 of FIG. 1, to a conductor, such as conductor 14, is illustrated in FIG. 5. The first conductive element comprises a first conductive material that is dissimilar from the conductive material of the conductor. For example, the first conductive material may comprise titanium and the conductor may comprise copper. The first conductive element may comprise any suitable component of an electronic assembly such as, for example, a housing component of an electrochemical cell, such as a battery, a capacitor, or the like.

The method may begin by cladding a second conductive element, such as second conductive element 20, comprising a facilitator material with the conductor (step 52). As described above, the facilitator material is any material that facilitates or accelerates the melting of the conductor. In addition, the facilitator material is metallurgically compatible with the material of the conductor. In a preferred embodiment, if the conductor is formed of copper, second conductive element 20 may be nickel, which, as described above, facilitates the melting of copper during welding. The second conductive element may be cladded with the conductor 14 using any suitable cladding method, such as hot roll cladding, hot press cladding, explosive cladding, fusion cladding, CVD, and the like.

A connector, such as connector 10 of FIG. 1, is fabricated by cladding a third conductive element, such as third conductive element 16, with a fourth conductive element, such as fourth conductive element 18 (step 54). Third conductive element 16 is formed of a material that is metallurgically compatible with the first conductive material. Preferably, the third conductive element comprises the first conductive material. Fourth conductive element 18 comprises a material that is metallurgically compatible with the facilitator material. Preferably, the fourth conductive element comprises the facilitator material. The third conductive element 16 may be cladded with the fourth conductive element 18 using any suitable cladding method, such as the cladding methods set forth above. After cladding the third conductive element and the fourth conductive element together to form the connector, the connector may be fabricated into any shape required by geometric or accessibility criteria. The connector may be shaped by stamping, machining, or any other suitable method. In addition, depending on welding requirements, the connector or portions thereof may be plated with an additional conductive material or materials, such as, for example, gold, to facilitate welding. In an optional embodiment, a portion of the connector may be encapsulated by a polymer material, such as, for example, polyetherimide, to increase structural integrity of the connector while still permitting electrical contact to the connector. While method 50 is described with cladding of the second conductive element and the conductor occurring before fabrication of the connector, it will be appreciated that the invention is not so limited and that the connector may be fabricated before or during cladding of the second conductive element and the conductor.

After formation of the connector, the second conductive element that is cladded to the conductor is joined to the third conductive element of the connector by welding or soldering (step 56). The fourth conductive element of the connector is welded to the first conductive element (step 58). In this manner, the conductor is electrically coupled to the first conductive element, which is dissimilar from the conductor, without burning or otherwise damaging the conductor and/or the first conductive element. In addition, the conductor and the first conductive element are reliably coupled together. The fourth conductive element may be welded to first conductive element 12 using any suitable welding process, such as resistance welding, laser welding, ultrasonic welding, or the like. While method 50 is described with step 58 performed after step 56, alternatively step 58 may be performed before step 56, that is, the fourth conductive element may be welded to the first conductive element 12 before the second conductive element is welded to the conductor.

Figure 6:
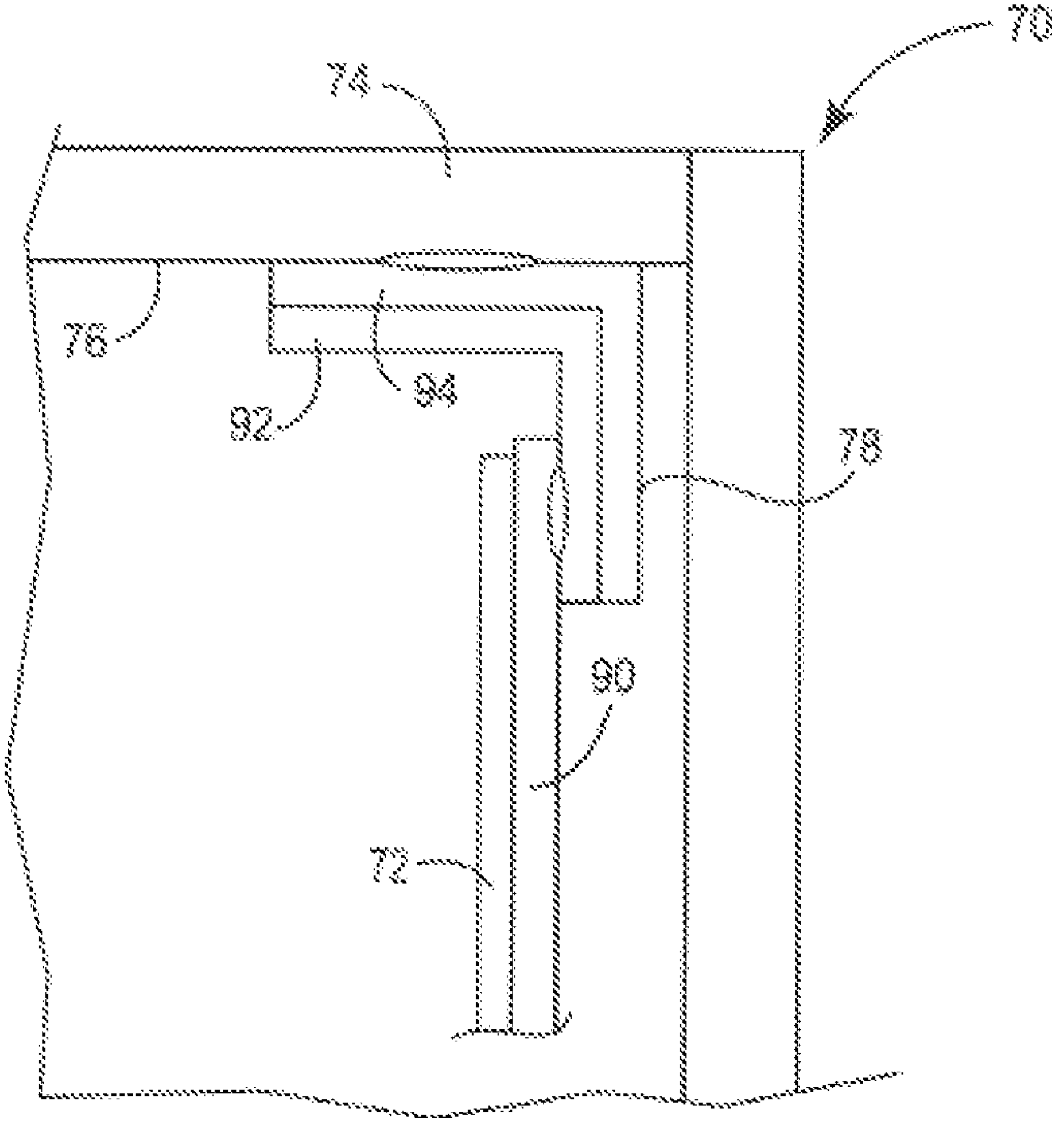
FIG. 6 is a cross-sectional view of a connector electrically coupling a copper electrode and a housing component of a battery, in accordance with an exemplary embodiment of the present invention.
Figure 7:
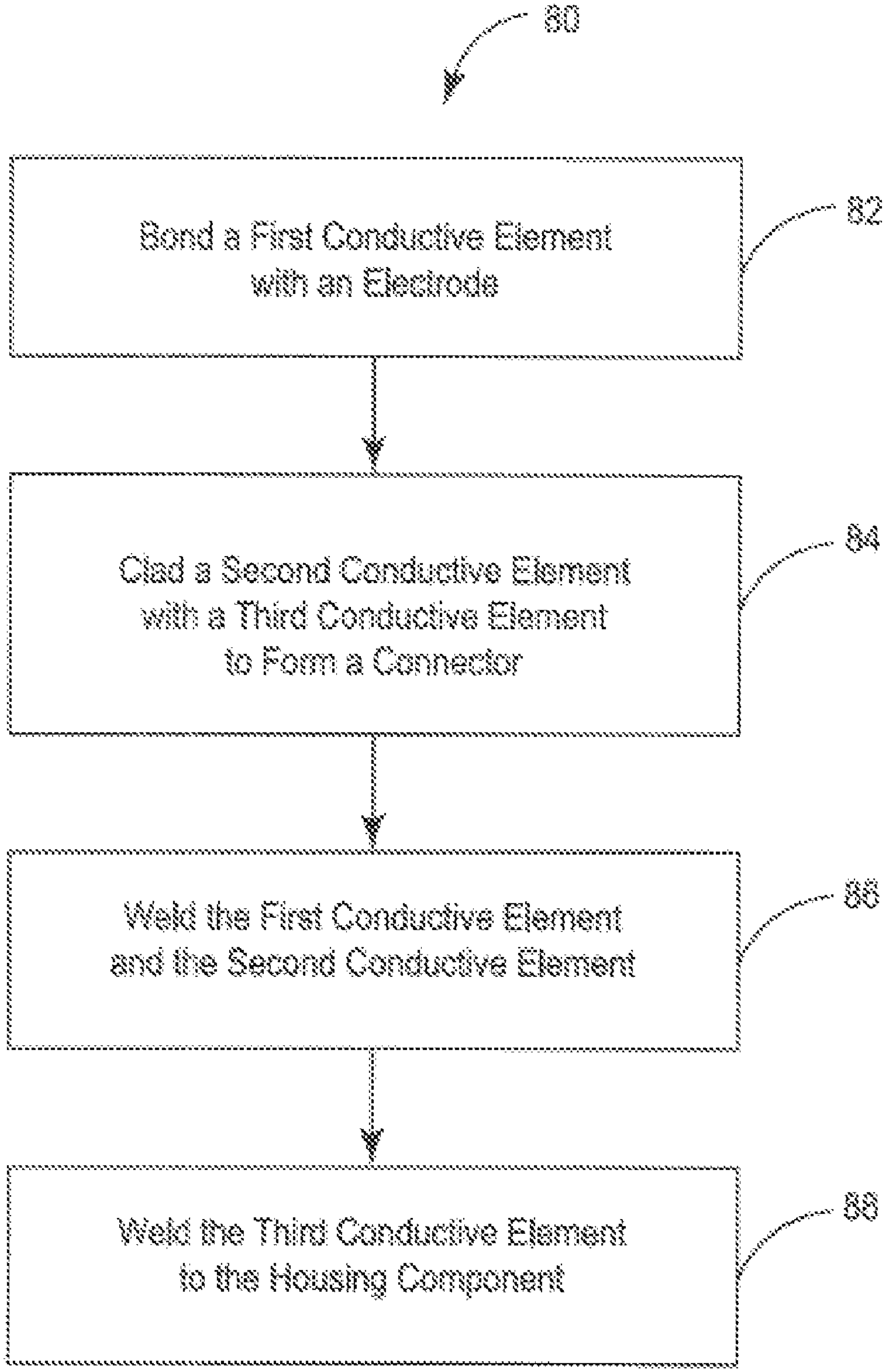
FIG. 7 is a flow chart illustrating a method for electrically coupling a copper electrode and a housing component of an electrochemical cell, in accordance with another exemplary embodiment of the present invention.

In accordance with another exemplary embodiment of the present invention, an electrode 72 of an electrochemical cell 70, illustrated in FIG. 6, can be electrically coupled to an internal surface 76 of a housing component 74, such as a cover or case, of the electrochemical cell by a connector 78 using a method 80, illustrated in FIG. 7. The housing component 74 is formed of or plated with a substantially corrosion-resistant metal such as, for example, titanium, stainless steel, or the like that is dissimilar from the electrode material, which may include copper, gold, silver, aluminum, any alloys thereof, or the like.

The method 80 may begin by welding or otherwise bonding a first conductive element 90 with the electrode 72 (step 82). The first conductive element 90 may be formed of any material that is metallurgically compatible or otherwise bondable with the conductor. For example, if the electrode is formed of copper, first conductive element 90 may be formed of nickel, which is metallurgically compatible with copper. The first conductive element 90 also may be a facilitator material that facilitates the welding of the conductor. The first conductive element may be welded to the electrode by laser welding, resistance welding, ultrasonic welding, or the like.

A second conductive element 92 is cladded with a third conductive element 94 to form connector 78 (step 84). Second conductive element 92 is formed of a material that is metallurgically compatible with the material of the first conductive element. Preferably, the second conductive element comprises the material of the first conductive element. Third conductive element 94 comprises a material that is metallurgically compatible with the substantially corrosion-resistant material of housing component 74. Preferably, the third conductive element 94 comprises the substantially corrosion-resistant material. The second and third conductive elements 92 and 94 may be cladded using any suitable cladding method, such as hot roll cladding, hot press cladding, explosive cladding, fusion cladding, CVD, sputtering, PVD, and the like. While method 80 is described with welding of the first conductive element and the electrode occurring before fabrication of the connector, it will be appreciated that the invention is not so limited and that the connector may be fabricated before or during welding of the first conductive element and the electrode.

After formation of the connector 78, the first conductive element 90 and the second conductive element 92 are welded together by laser welding, resistance welding, or the like (step 86). The third conductive element 94 of the connector 78 and the housing component 74 also are welded together (step 88). In this manner, the electrode is electrically coupled to the housing component, which is dissimilar from the electrode, without burning or otherwise damaging the electrode and/or the housing component. In addition, the electrode and the housing component are reliably coupled together. The third conductive element 94 and the housing component 74 may be welded together using any suitable welding process, such as resistance welding, laser welding, ultrasonic welding, or the like. While method 80 is described with step 88 performed after step 86, alternatively step 88 may be performed before step 86, that is, the third conductive element may be welded to the housing component 74 before the first conductive element 90 and the second conductive element 92 are welded together.

Figure 8:
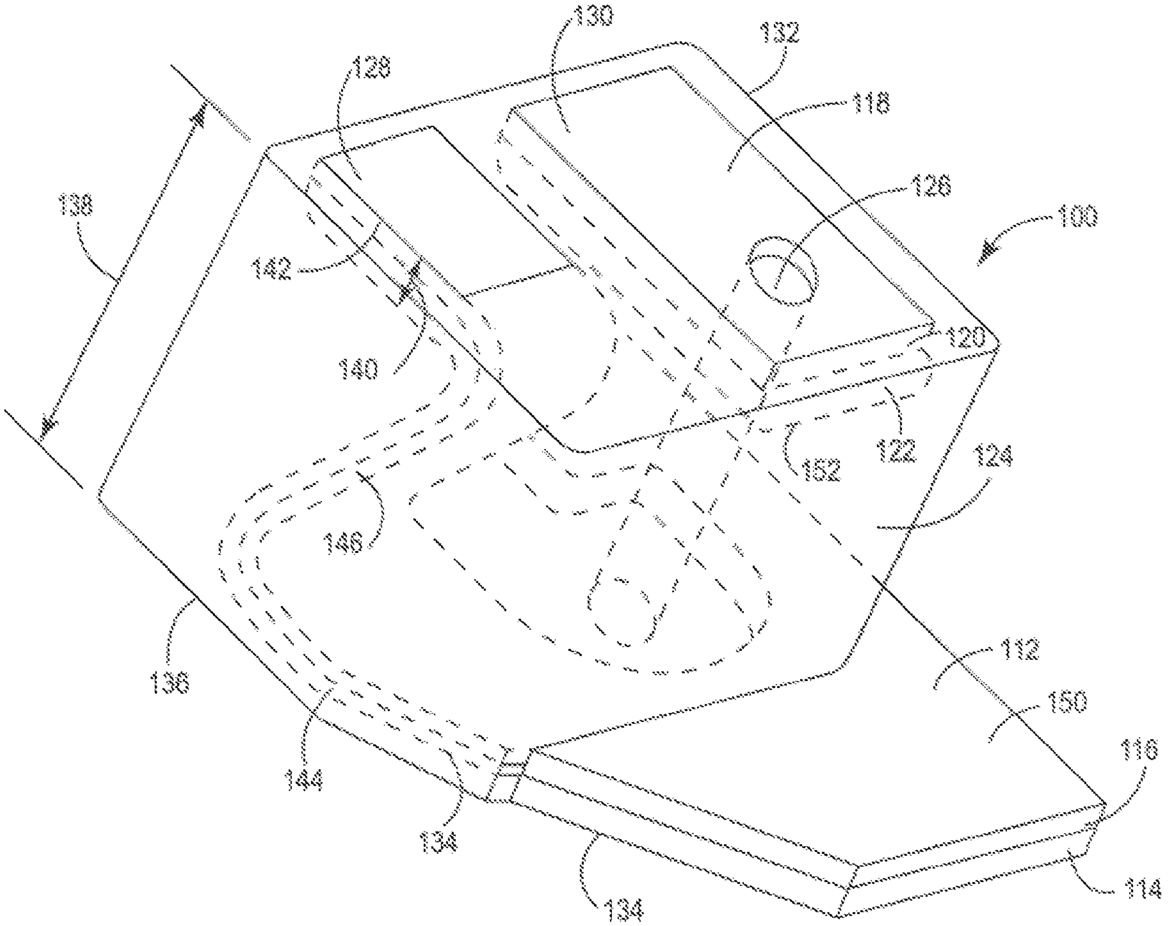
FIG. 8 is a plan view of a connector, in accordance with an exemplary embodiment of the present invention.
Figure 9:
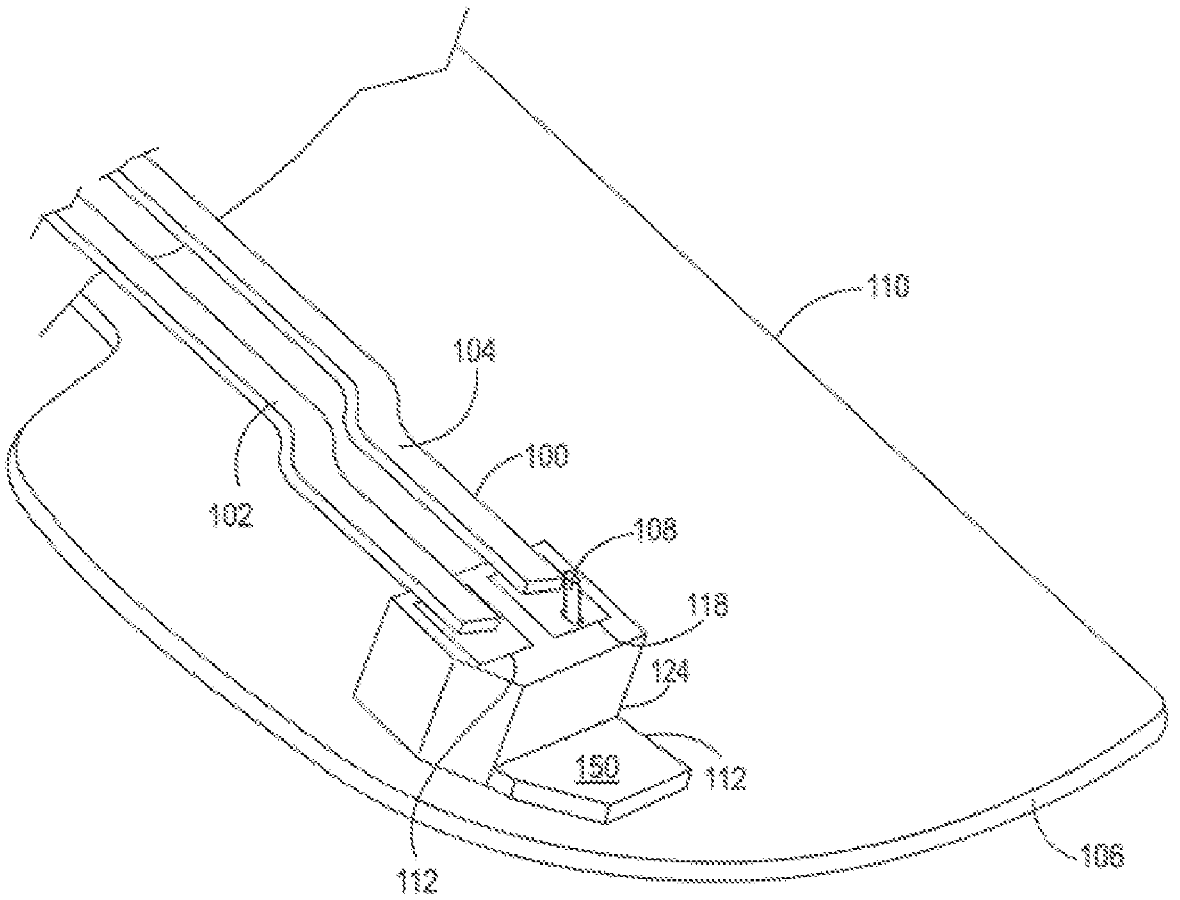
FIG. 9 is a plan view of the connector of FIG. 8 electrically coupling two copper conductors and a housing component of an electrochemical cell, in accordance with an exemplary embodiment of the present invention.

A connector 100 in accordance with yet another exemplary embodiment of the present invention is illustrated in FIGS. 8 and 9. Connector 100 is used to electrically couple conductive components of an electrical assembly to a first terminal and to a second terminal of an electrochemical cell 110. For example, the electrically conductive components may comprise first and second conductive wires 102 and 104 or other conductors that extend from an electrical assembly (not shown), such as an integrated circuit, to the electrochemical cell. For illustration purposes, electrochemical cell 110 is shown in FIGS. 8 and 9 as a battery, although it will be appreciated that the invention is not so limited. A first terminal of the electrochemical cell 110 includes an element or component 106 of the housing of the electrochemical cell, such as a battery case or battery cover. The housing component 106 is formed of a conductive housing material, such as titanium or stainless steel, which is dissimilar from the material of the conductive components. A second terminal includes a feedthrough pin 108 that extends from internally within the electrochemical cell through the housing component 106 to the exterior of the cell. The feedthrough pin may be formed of a material such as niobium, which also may be dissimilar from the material of the conductive components. As described above, bonding of the conductors 102 and 104 directly to the terminals 106 and 108 may be challenging due to the dissimilarity of the materials. If the conductors 102 and 104 are welded to the terminals 106 and 108 of the electrochemical cell 110 at too high of a temperature, the conductors may be burned or otherwise damaged, leading to lower device yield.

Accordingly, connector 100 serves to couple conductors 102 and 104 to terminals 106 and 108. Connector 100 comprises a first conductive component 112. First conductive component 112 is formed of a cladded combination of a first conductive element 114 formed of a first conductive material and a second conductive element 116 formed of a second conductive material. The first conductive material of first conductive element 114 is metallurgically compatible with the conductive housing material. Preferably, the first conductive material is the same as the housing material from which the housing component 106 is formed. The second conductive material of second conductive element 116 is formed of a conductive material that is metallurgically compatible with the material of first conductor 102. For example, first conductor 102 may be formed of copper or gold and second conductive element 116 may be formed of nickel. The first conductive element 114 and the second conductive element 116 may be cladded together using any of the cladding methods set forth above.

Connector 100 further comprises a second conductive component 118. Second conductive component 118 has a third conductive element 120 formed of a third conductive material that is weldable with the material of second conductor 104 and the feedthrough pin 108. For example, second conductor 104 may be formed of copper, the feedthrough pin 108 may be formed of niobium, and third conductive element 120 thus may be formed of nickel. Preferably, third conductive element 120 is formed of the same material as second conductive element 116, that is, the second conductive material. In an exemplary embodiment of the invention, second conductive component 118 also has a fourth conductive element 122 that is cladded with the third conductive element 120. Preferably, fourth conductive element 122 is formed of the same material as first conductive element 114, that is, the first conductive material, so that first conductive component 112 and second conductive component 118 can be stamped or machined from the same cladded plate. For example, if the housing component is formed of titanium, fourth conductive element 122 may be formed of titanium. In another embodiment, fourth conductive element 122 may be formed of a material that welds readily to the feedthrough pin 108. The third conductive element 120 and the fourth conductive element 122 may be cladded together using any of the cladding methods set forth above. Second conductive component 118 further comprises a conduit 126 which extends through third conductive element 120, and fourth conductive element 122 if present. Conduit 126 is configured to receive the feedthrough pin 108 and permit bonding of the feedthrough pin to the third conductive element 120 and/or fourth conductive element 122.

First conductive component 112 and second conductive component 118 are physically connected by an insulating portion 124 that insulates first conductive component 112 from second conductive component 118. Insulating portion 124 can comprise any suitably rigid and insulating polymer material, such as polyetherimide, polyetheretherketone (PEEK), polysulfone (PSU), and liquid crystal polymer (LCP).

Figure 10:
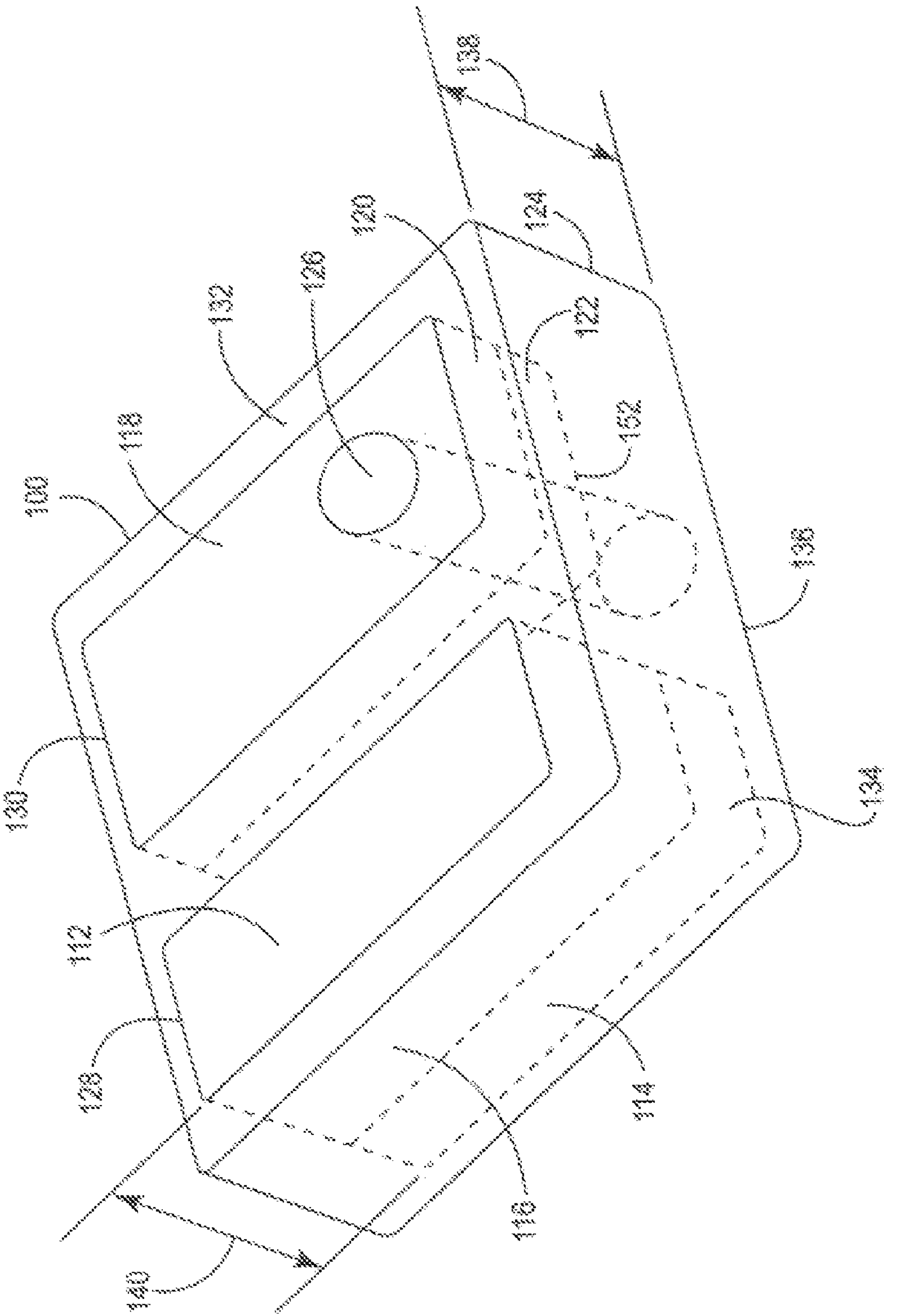
FIG. 10 is a plan view of a connector, in accordance with another exemplary embodiment of the present invention.

In an exemplary embodiment of the invention, first conductive component 112 has a first exposed surface 128 of second conductive element 116 and second conductive component 118 has a first exposed surface 130 of third conductive element 120 that are not encapsulated by insulating portion 124 so that exposed surfaces 128, 130 may be electrically coupled to first and second copper-comprising conductors 102 and 104. An unexposed surface 152 of third conductive element 120, or fourth conductive element 122 if present, is fully insulated by insulating portion 124. Referring momentarily to FIG. 10, in one exemplary embodiment of the invention, in addition to first exposed surface 128, first conductive component 112 has a second exposed surface 134 of second conductive element 114. First exposed surfaces 128 and 130 lie in a first plane 132 and second exposed surface 134 of second conductive element 114 lies in second plane 136 that is parallel to, but remote from, first plane 132. Accordingly, a thickness of connector 100 designated by double-headed arrow 138 is the same as a thickness designated by double-headed arrow 140 of first conductive component 112. Conduit 126 extends from first plane 132 to second plane 136. In this regard, second exposed surface 134 of first conductive component 112 may be electrically coupled to the housing component 106 of the electrochemical cell 110 while unexposed surface 152 of third conductive element 120, or fourth conductive element 122 if present, is insulated from housing component 106. In addition, third conductive element 120 (and/or fourth conductive element 122) of second conductive component 118 may be electrically coupled to the feedthrough pin 108, which extends through conduit 126.

Referring back to FIGS. 8 and 9, in another, preferred embodiment of the invention, first conductive component 112 has a first portion 142 that includes first exposed surface 128 in first plane 132. Again, first exposed surface 128 is coplanar with first exposed surface 130 of second conductive component 118. First conductive component 112 also has a second portion 144 that includes second exposed surface 134 in second plane 136. A transition portion 146 of first conductive component 112 physically and electrically couples first portion 142 and second portion 144. Insulating portion 124 may encapsulate all but the exposed surface 130 of second conductive component 118 and may encapsulate portions of first conductive component 112. For example, a wing portion 150 of first conductive component 112 may extend beyond the insulating portion 124 to provide additional surface area for affixing connector 100 to housing component 106. Conduit 126 extends from first plane 132 through the insulating portion 124 to second plane 136. In this manner, connector 100 can have a thickness 138 that is larger than the thickness 140 of first conductive component 112 so that connector 100 is substantially rigid.

Accordingly, methods and structures for electrically coupling a conductor and a conductive element comprising a dissimilar material are provided. The methods and structures provide for a reliable electrical connection between the conductor and the conductive element without damage to either structure. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A method for electrically coupling a first conductive element formed of a first conductive material to a conductor formed of a dissimilar second material, the method comprising the steps of:

cladding a second conductive element with the conductor, the second conductive element comprising a facilitator material that facilitates the melting of the second material;

cladding a third conductive element comprising a third material that is metallurgically compatible with the facilitator material with a fourth conductive element comprising a fourth material that is metallurgically compatible with the first conductive material to form a connector; and welding the fourth conductive element and the first conductive element; and welding the second conductive element and the third conductive element such that the conductor welds to the third conductive element.

2. The method of claim 1, wherein the step of cladding a third conductive element comprising a third material that is metallurgically compatible with the facilitator material with a fourth conductive element comprising a fourth material that is metallurgically compatible with the first conductive material comprises the step of cladding the third conductive element comprising the facilitator material with the fourth conductive element.

3. The method of claim 1, the step of cladding a second conductive element with the conductor comprises the step of cladding the second conductive element comprising nickel with a conductor comprising copper.

4. The method of claim 1, wherein the step of cladding a third conductive element comprising a third material that is metallurgically compatible with the facilitator material with a fourth conductive element comprising a fourth material that is metallurgically compatible with the first conductive material comprises the step of cladding the third conductive element with the fourth conductive element comprising the first conductive material.

5. The method of claim 1, wherein the first conductive material comprises titanium and wherein wherein the step of cladding a third conductive element comprising a third material that is metallurgically compatible with the facilitator material with a fourth conductive element comprising a fourth material that is metallurgically compatible with the first conductive material comprises the step of cladding the third conductive element with the fourth conductive element comprising titanium.

6. The method of claim 1, further comprising the step of shaping the connector by stamping or machining.

7. The method of claim 1, further comprising the step of plating at least a portion of the connector with a material that facilitates welding.

8. The method of claim 1, further comprising the step of encapsulating a portion of the connector in a polymer material.

9. The method of claim 1, wherein the step of cladding a third conductive element comprising a third material that is metallurgically compatible with the facilitator material with a fourth conductive element comprising a fourth material that is metallurgically compatible with the first conductive material comprises the step of cladding the third conductive element so that the third conductive element is inlaid within the fourth conductive element.

10. The method of claim 1, wherein the step of cladding a third conductive element comprising a third material that is metallurgically compatible with the facilitator material with a fourth conductive element comprising a fourth material that is metallurgically compatible with the first conductive material comprises the step of cladding a fifth element with the third conductive element and the fourth conductive element.

11. The method of claim 10, wherein the step of cladding a fifth element with the third conductive element and the fourth conductive element comprises the step of cladding the fifth element as an interlayer disposed between the third conductive element and the fourth conductive element.

12. The method of claim 1, wherein the step of cladding a third conductive element comprising a third material that is metallurgically compatible with the facilitator material with a fourth conductive element comprising a fourth material that is metallurgically compatible with the first conductive material comprises the step of cladding by hot roll cladding, hot press cladding, explosive cladding, fusion cladding, chemical vapor deposition, sputtering, or physical vapor deposition (PVD).

13. A method for electrically coupling a housing component of an electrochemical cell to a conductor, wherein the housing component comprises a first conductive material and the conductor comprises a dissimilar conductive material, the method comprising the steps of:

bonding a first conductive element comprising a second conductive material to the conductor, wherein the second conductive material is metallurgically compatible or bondable with the dissimilar conductive material of the conductor;

cladding a second conductive element comprising the second conductive material to a third conductive element comprising the first conductive material to form a connector;

welding the first conductive element and the second conductive element; and welding the third conductive element and the housing component.

14. The method of claim 13, wherein the step of bonding a first conductive element to the conductor comprises the step of bonding the first conductive element and the conductor by laser welding, resistance welding, ultrasonic welding, or soldering.

15. The method of claim 13, wherein the step of bonding a first conductive element to the conductor comprises the step of bonding a first conductive element comprising nickel to a conductor comprising copper.

16. The method of claim 13, wherein the step of bonding a first conductive element to the conductor comprises the step of bonding the first conductive element to an electrode disposed within the electrochemical cell.

* * * * *